United States Patent

Frommer et al.

Patent Number: 6,071,415
Date of Patent: Jun. 6, 2000

[54] WATER PURIFICATION SYSTEM AND REMOVAL OF HALIDES

[75] Inventors: Moshe A Frommer, Rehovot; Israel Dalven, Emmanuel, both of Israel

[73] Assignee: Purotech International Inc., New York, N.Y.

[21] Appl. No.: 08/556,910

[22] PCT Filed: May 25, 1994

[86] PCT No.: PCT/US94/05849

§ 371 Date: Nov. 28, 1995

§ 102(e) Date: Nov. 28, 1995

[87] PCT Pub. No.: WO94/29228

PCT Pub. Date: Dec. 22, 1994

[30] Foreign Application Priority Data

Jun. 3, 1993 [IL] Israel ......................................... 105905

[51] Int. Cl.[7] .................. C02F 9/00; C02F 1/50; C02F 1/58; B01D 24/02
[52] U.S. Cl. .................. 210/669; 210/683; 210/753; 210/754; 210/764; 210/259; 210/266; 210/501
[58] Field of Search .................. 210/668, 669, 210/683, 694, 753, 764, 205, 206, 259, 266, 284, 501, 506, 754

[56] References Cited

U.S. PATENT DOCUMENTS

| | | |
|---|---|---|
| 3,294,572 | 12/1966 | Piccione . |
| 4,187,183 | 2/1980 | Hatch . |
| 4,298,475 | 11/1981 | Gartner . |
| 4,461,711 | 7/1984 | Behrens . |
| 4,769,143 | 9/1988 | Deutsch . |
| 4,995,976 | 2/1991 | Vermes . |
| 5,061,367 | 10/1991 | Hatch . |
| 5,126,044 | 6/1992 | Magnusson . |
| 5,366,636 | 11/1994 | Marchin . |

FOREIGN PATENT DOCUMENTS 1-304095 12/1989 Japan .

*Primary Examiner*—Thomas M. Lithgow
*Attorney, Agent, or Firm*—Evenson, McKeown, Edwards & Lenahan, P.L.L.C.

[57] ABSTRACT

A process for the purification of water to render it fit for drinking. It is passed first through a halogenated resin and after this through activated carbon impregnated with silver, which contains a comparatively high silver content, of at least two percent by weight, and up to about 14 weight percent. A purification system for carrying out such process comprising a sequence of a layer of halogenated resin followed by activated carbon impregnated with at least two weight percent silver. The impregnated silver absorbs efficiently a high percentage of bromide/bromine, iodide/iodine or mixtures of these.

7 Claims, 6 Drawing Sheets

WATER PURIFICATION SYSTEM AND REMOVAL OF HALIDES

FIELD OF THE INVENTION

Methods for impregnating activated carbon with silver to yield silver loadings much higher than that available commercially are provided, which provide products useful for purifying water, especially from iodides and bromides which may be eluted from iodinated and halogenated disinfecting resins, lowering the concentrations of the contaminating halides to levels acceptable for continuous drinking applications and enabling regeneration of the silver and possibly also of iodine from the precipitated silver halides.

BACKGROUND OF THE INVENTION

Silver impregnated activated carbon, (Ag-GAC), is a well known product, used widely for purifying process-water and drinking-water. The function of the silver bound to the activated carbon is to avoid bacterial growth on the carbon bed and in the water in contact with it. Filter cartridges containing Ag-GAC do not kill bacteria during normal filtration rates. For this reason Ag-GAC is described as a Bacteriostatic medium and not a Bactericide.

The maximum admissible concentration of silver in drinking water is: 0.05 mg/L (50 ppb) in the USA and Canada and 0.01 mg/L (10 ppb) in the EEC. Therefore, in order to enable application of Ag-GAC for purifying drinking water, the loading of silver on the carbon is low, usually lower than one percent. The highest silver loading offered commercially is 1.05%.

Recently iodinated and halogenated resins have been introduced as water purifiers capable of "instantaneously" killing bacteria and viruses upon contact between the treated water and the disinfecting resin. The use of equipment containing such disinfecting resins for purifying drinking water has been approved by the US-EPA for emergency and intermittent applications, not for continuous consumption, because disinfecting resins elute minute amounts of iodine and iodides into the treated water, and excessive consumption of iodine/iodide may cause hyperthyroidism. The "adjusted acceptable daily intake" (AADI), of iodine/iodide has been determined to be 1.19 mg/L (Handbook of Water Quality, Standards and Controls by John De Zuane, P. E., Van Nostrand Reinhold, New York 1990). The concentrations of iodine/iodide eluted to the treated water by commercial disinfecting resins vary between 2 to 15 ppm (mg/L), depending on the type of the resin and on the salinity and temperature of the treated water. Therefore, application of equipment containing iodinated resins for purifying drinking water for continuous consumption can be possible only if the drinking water purifier contains means which reduce the concentration of iodine/iodide in the product water to 1.19 ppm and preferably considerably lower.

Iodides can be removed almost absolutely from aqueous solutions by precipitating them with silver ions. The solubility product of AgI at 25° C. is $1.5 \times 10^{-16}$, a million times lower than that of AgCl ($1.56 \times 10^{-10}$) at the same temperature. Therefore, iodides can effectively be eliminated from drinking water via precipitation as AgI, even in the presence of a large excess of chloride ions such as those existing in drinking water. Metallic silver or silver chloride can generate sufficient concentrations of silver ions for precipitating iodides. However, in order to be effective, the surface area of the silver-ion generating solid must be very large. Otherwise it will very quickly be coated with AgI precipitate and become "blind" to the aqueous solution. Granular Activated Carbon (GAC), has a large surface area and can be an efficient "carrier" for silver. Indeed, Ag-GAC has proven to be effective in removing iodide ions from drinking water.

Nevertheless, commercially available Ag-GACs are not practical for removing iodides from water disinfected by iodinated resins because their silver loading is very low. Thus, even if we take GAC impregnated with 1.05% silver (the highest silver loading available commercially), than 300 ml of such Ag-GAC (the amount which can be included in a 10" CounterTop Drinking Water Purifier) weigh ~150 grams and contain only ~1.50 gr. (1,500 mg) of silver. This amount of silver can, theoretically, precipitate only 1.5×(126.9/107.9)=1.76 gr. of iodides. Practically, the precipitation efficiency is less than 80%. If we assume that the concentration of iodine/iodide in the water disinfected by an iodinated resin is only 3 ppm, then 300 ml. of 1.05% Ag-GAC would be sufficient for treating less than 470 liters of disinfected water, which is too low a capacity. The minimum reasonable capacity for a 10" CounterTop Drinking Water Purifier (which contains a $5\mu$ PreFilter, 300 ml iodinated resin and 300 ml of Ag-GAC) is 1,500 liters—the annual drinking water consumption of one person. With 1.05% Ag-GAC we can attain less than one third that value.

SUMMARY OF THE INVENTION

The present invention relates to a purification device for producing potable water for drinking by humans, comprising a sequence of a bed of a halogenated resin, followed by a bed or separate container containing silver-impregnated activated carbon, loaded with more than two weight percent of silver. The carbon is preferably loaded with from 4 to 14 weight-% of silver and a filter is provided for filtering out particulate material.

The invention further relates to a process for the purification of water and for the purpose of converting it to water fit for human consumption comprising passing feed water through a sequence of a halogenated resin, followed by a bed of silver-impregnated activated carbon containing at least two weight percent of silver. Preferably the resin used is an iodinated one, and preferably the impregnated carbon contains between 4 and 14 weight percent silver.

The invention also relates to the novel silver impregnated activated carbon containing at least two percent by weight of silver. The system is useful for the purification or treatment of water for reducing the concentration of iodide/iodine in water and also for reducing the concentration of bromide/bromine, or of mixed iodide/bromide in water. It can be used as a post treatment for water disinfected by passage through an iodinated or halogenated resin. It can be used in conjunction with iodinated resins, utilizing the precipitated silver iodide for regenerating silver and iodine.

Ag-GAC loaded with at least 3% silver is therefore desired for practical elimination of iodine/iodide from water disinfected by iodinated resins. Such a product also enables a considerable reduction of the cost of water purification by disinfecting resins, because both the expensive silver and the expensive iodine when precipitated as AgI can easily be trapped (filtered out) by a coarse post filter and regenerated. Furthermore, due to the extremely low solubility of AgI, placement of Ag-GAC treatment down-stream the iodinated-resin-filter guarantees that the concentration of both silver and iodine will be lower than the maximum permissible levels for continuous drinking applications.

A device for purifying water containing iodine, anion exchange resin and bacteriostatic carbon has been described in U.S. Pat. No. 4,769,143. This device contains a commercial silver impregnated activated carbon in which the silver loading is 1.05% or less. The purpose of incorporating this Ag-GAC in the device is to prevent bacteria growth in the activated carbon chamber at the exit port. The inventors apparently were unaware that the presence of relatively high concentration (2–15 ppm) of iodine ions in the treated water would quickly convert the small amount ($\leq 1.05\%$) of silver present to silver iodide, which is inactive as a bacteriostat. No mention is made of the need to lower the level of iodine in the treated water for making it suitable for continuous human consumption, nor is such a function claimed or hinted at. Furthermore, the device contains so little silver that it would be useless for rendering the treated water relatively free of iodide ions for more than a very limited use. Therefore, although the prior art does reveal the existence of highly silver impregnated carbon (U.S. Pat. No. 3,294,572), there is no mention of the use of silver impregnated carbon, of any silver loading, for rendering water treated with iodinated resins suitable for long term human consumption. As stated above, the reduction of iodine levels is a requirement for the expanded utilization of iodinated resin technology for treating unsafe drinking water, a major health menace worldwide.

BRIEF DESCRIPTION OF THE FIGURES

The invention is illustrated with reference to the enclosed schematical graphical representations in which.

Figure 1:
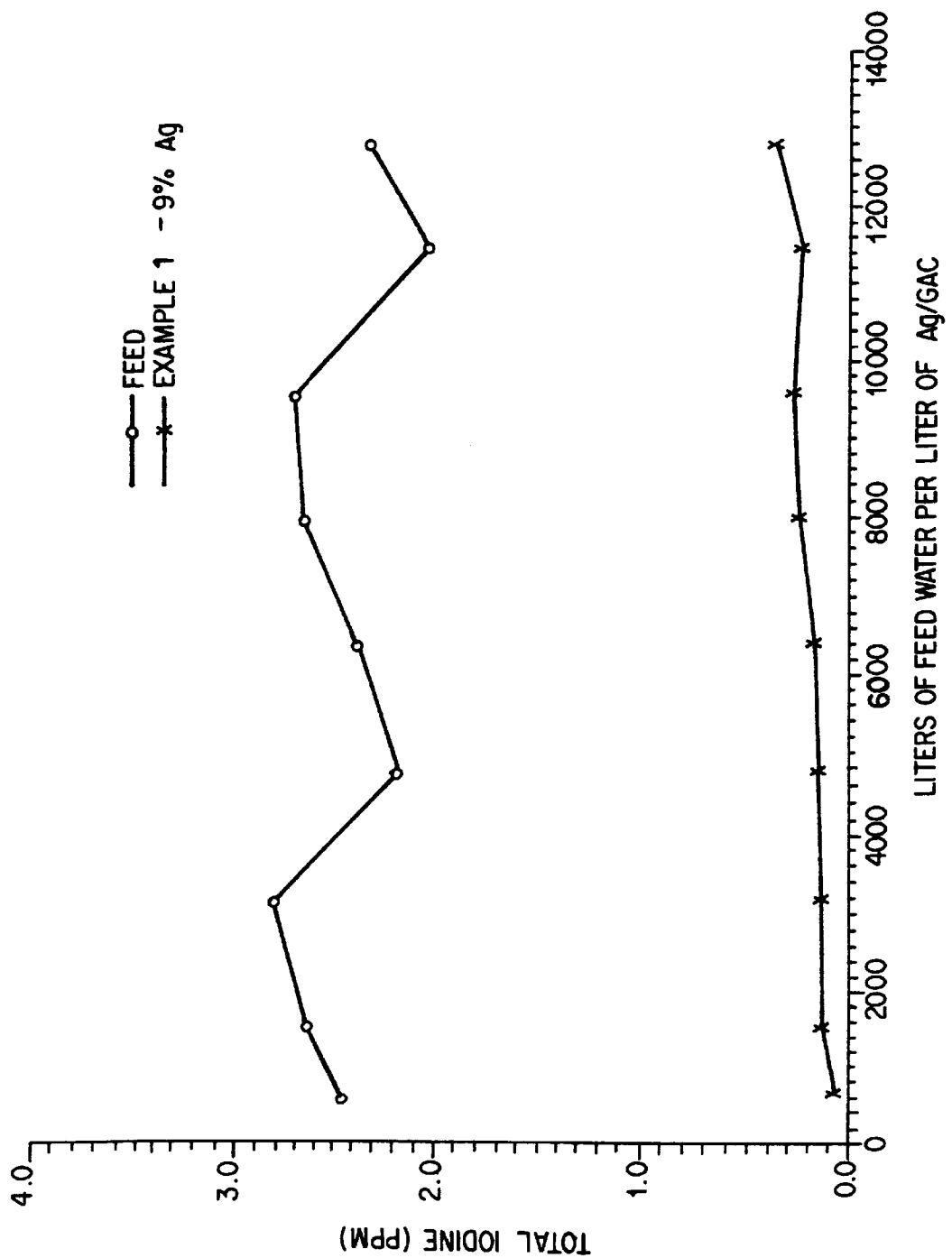
FIG. 1 illustrates total iodine elimination of AG/GAC against quantity of water passed through the filter, according to Example 1.

EXAMPLES
A. Preparation of Highly Loaded Ag-GAC

Example 1

25.8 g Silver nitrate, 70 ml water, and 31 ml of a 25% Ammonia (as $NH_3$) solution and were combined and stirred until dissolved. The solution was added slowly in 10 ml portions to 165 g 20–50 mesh granulated activated carbon, which had been previously washed with nitric acid and dried. Agitation between additions was necessary to assure an even mixture. After standing 15 minutes a solution of 15 g fructose in 80 ml of water was added. The mixture was placed in an 80° C. oven for 68 hrs. The small amount of supernatant liquid showed no precipitate with HCl. The product was rinsed well with water and dried at 250° C. The yield was 181.2 g, corresponding to 9% silver.

Example 2

81 g of nitric-acid-washed, dried GAC and 25 ml of a cold 1.65 M Hydrazine solution were combined and mixed. A solution chilled to ~8° C. containing 12.6 g silver nitrate, 5 g EDTA, 45 ml water and 20 ml of a 25% ammonia solution was added. The mixture was left at room temperature for one hour. The supernatant liquid was tested with 0.1 N HCl and no precipitate was observed, indicating complete reaction. The product GAC was washed and dried at 250° C., yielding 97.6 g, corresponding to 8.2% silver.

Example 3

To 90 g of nitric-acid-washed, dried GAC was added 18 g silver nitrate dissolved in 50 ml water with gentle stirring. The mixture was let stand for 15 min. A solution containing 100 ml water, 8.5 g sodium hydroxide and 26 g sodium dithionite (sodium hydrosulfite, 85% min assay) was added rapidly and mixed gently. After 1 hr the GAC is rinsed with water and dried at 250° C. The yield was 103 g, corresponding to 11.1% silver; however, it appeared that some silver was lost during the rinse.

Example 4

To 170 ml of nitric-acid-washed, dried GAC (91.4 g) was added a solution a solution of 10.8 g silver nitrate in 100 ml water giving a moist mixture with no free solution. This mixture is added slowly with stirring to a solution of 50 g sodium chloride in 500 ml deionized water. The supernatant solution was filtered, revealing only 0.7 g of residue (mostly carbon fines). After rinsing and drying the weight was 100.8 g corresponding to 6.8% silver as silver chloride.

B. Elimination of Iodine/Iodides from Water treated by an Iodinated Resin

Figure 2:
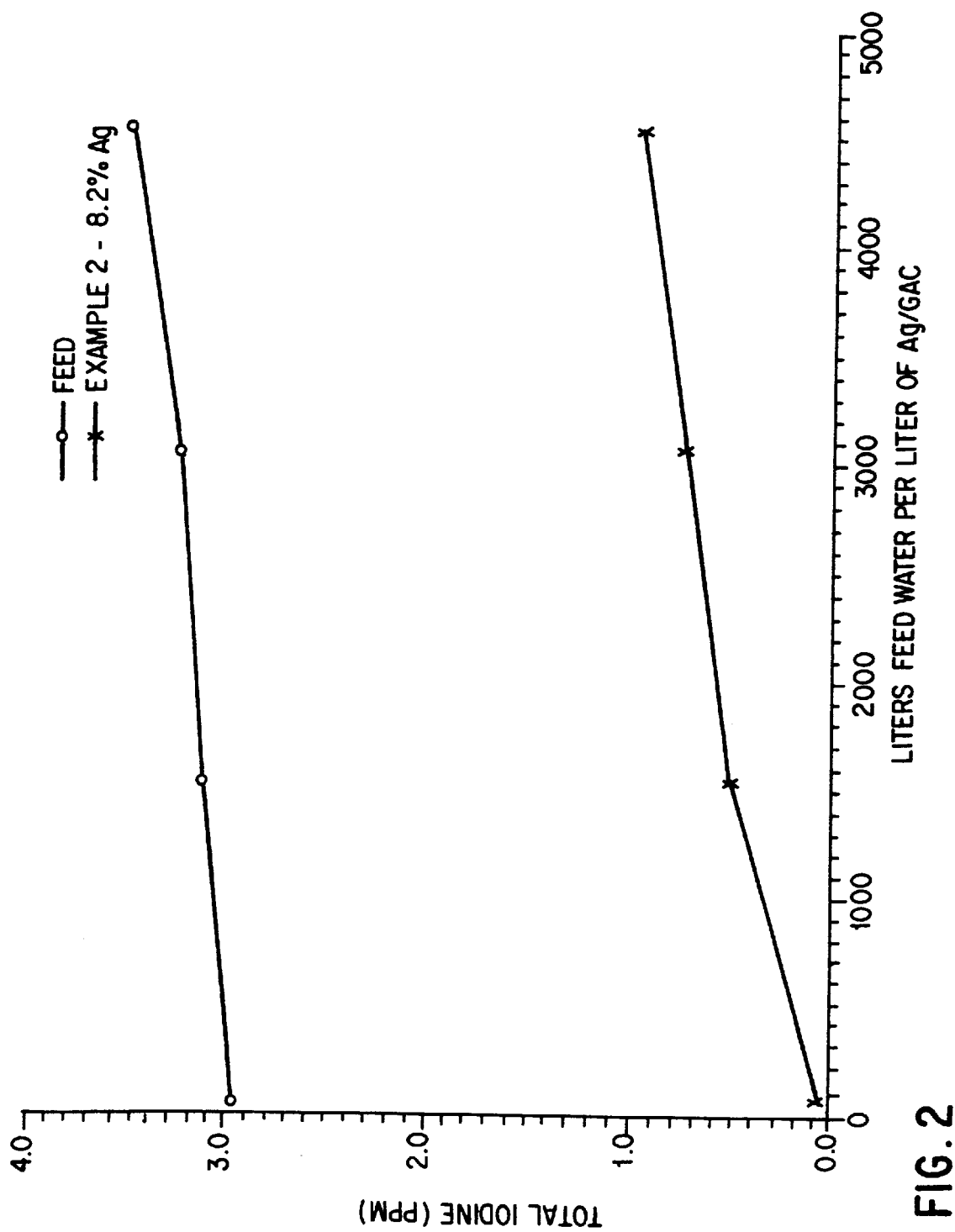
FIG. 2 is a similar graph, relating to Example 2.
Figure 3:
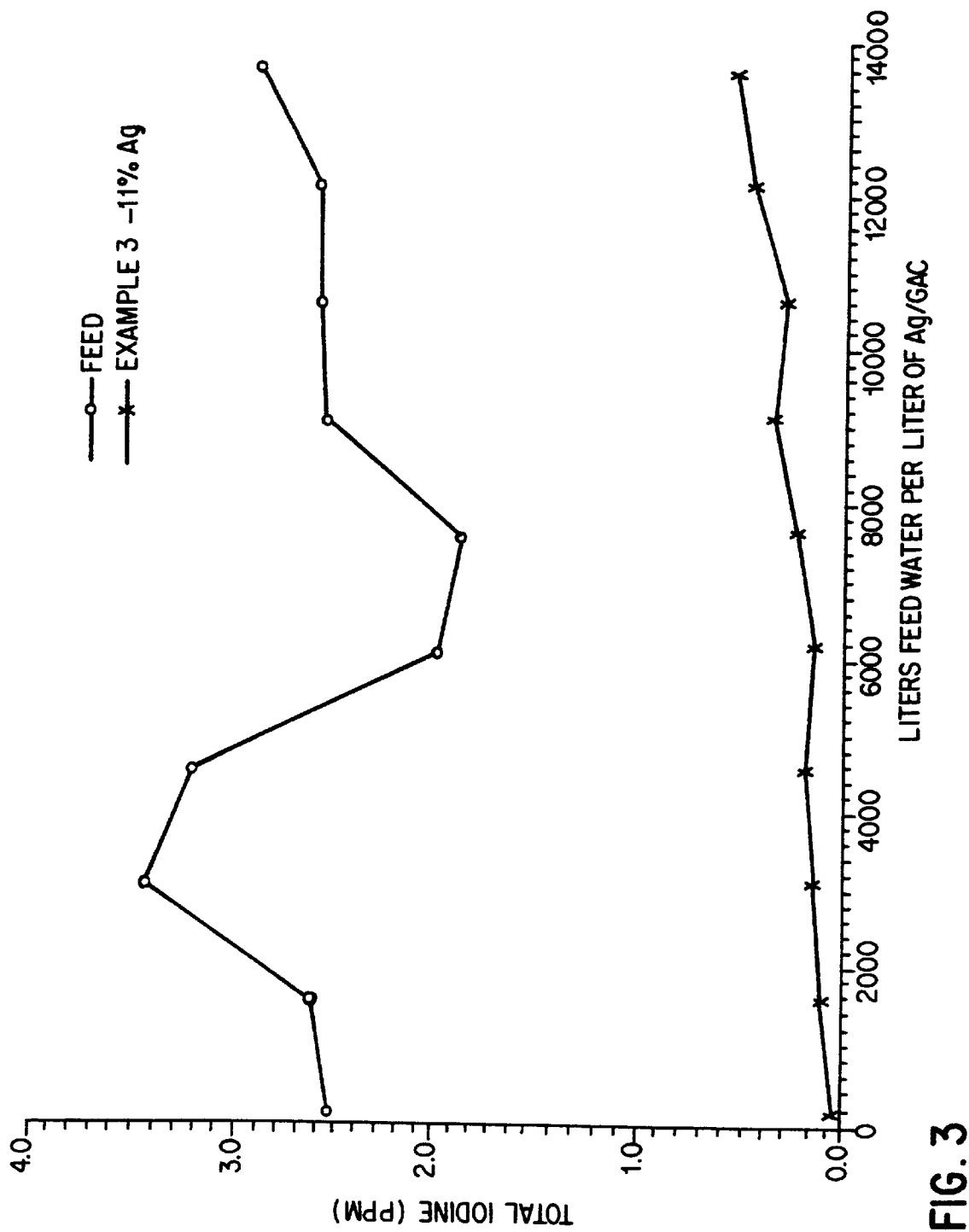
FIG. 3 is a similar graph, relating to Example 3.
Figure 4:
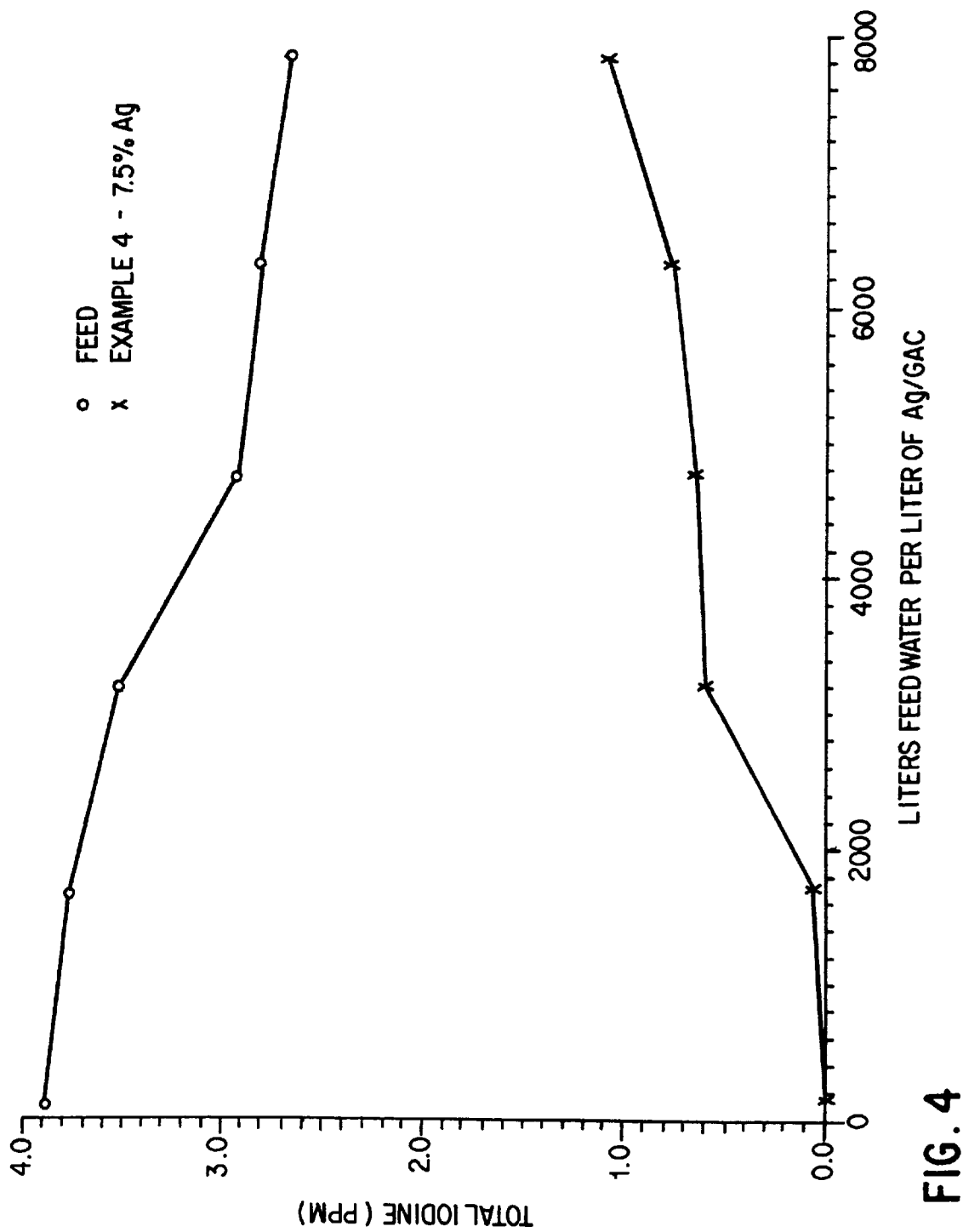
FIG. 4 is a similar graph, relating to Example 4
Figure 5:
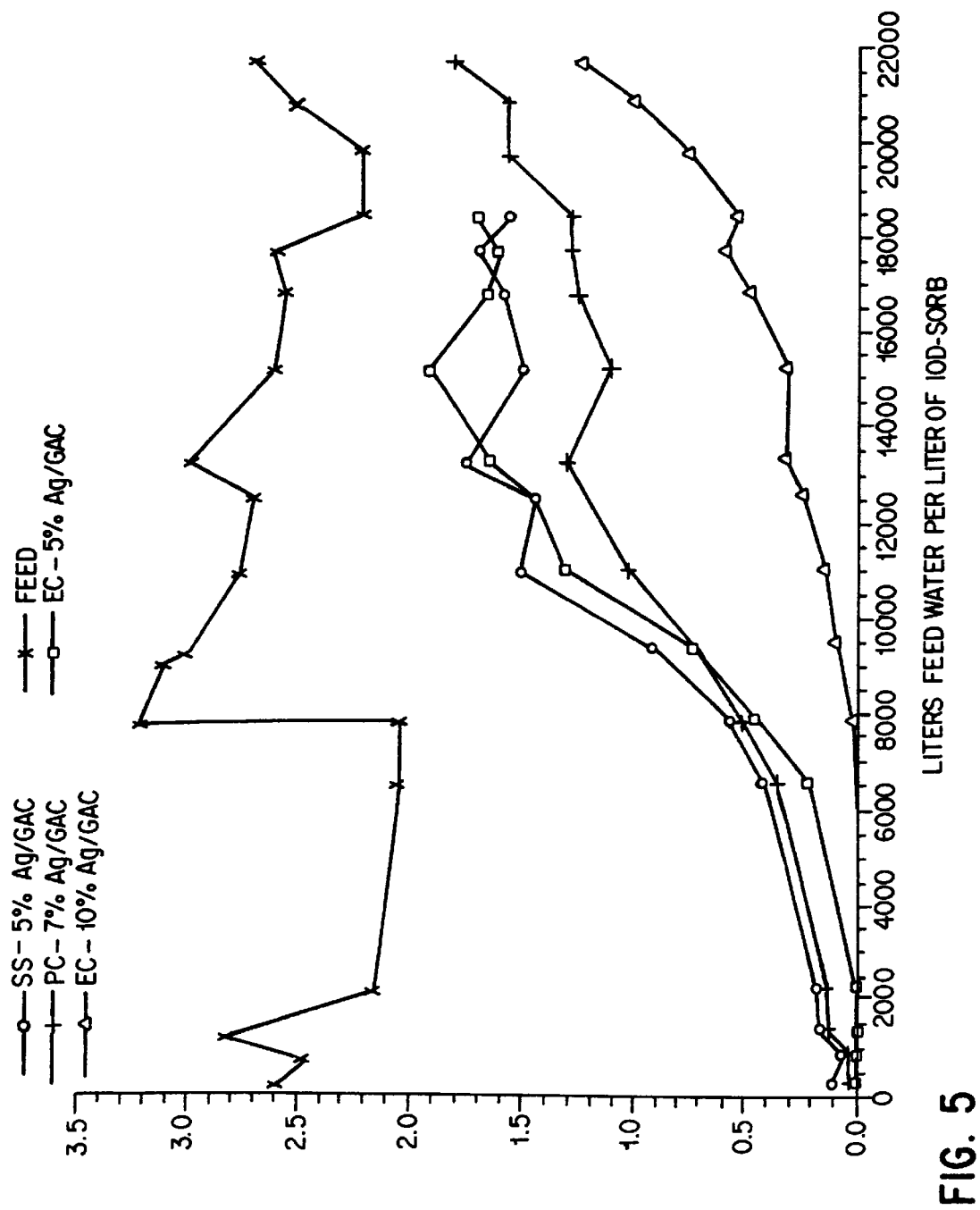
FIG. 5 illustrates the effectivity of activates carbon with different silver content in reducing iodine content.
Figure 6:
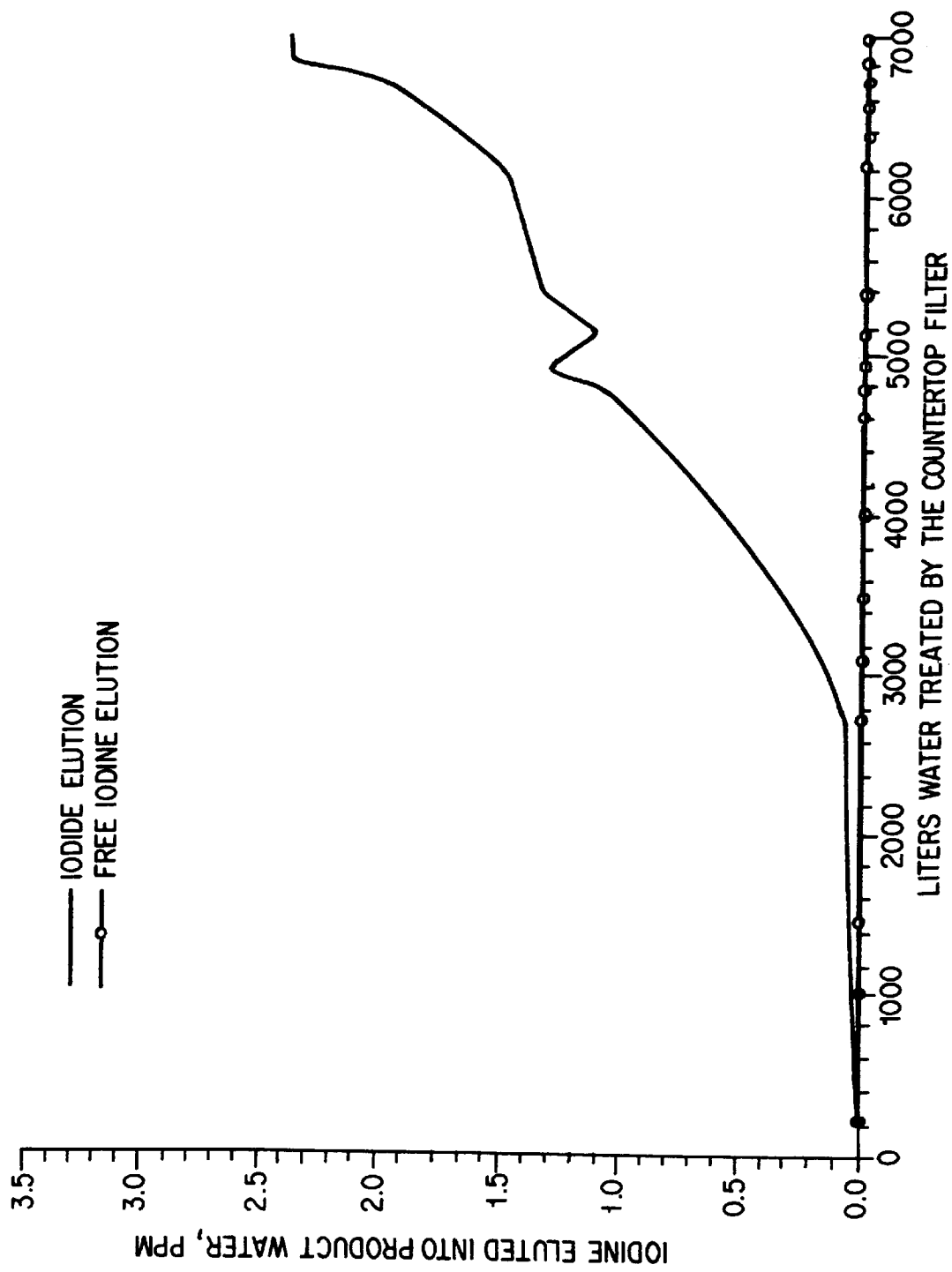
FIG. 6 illustrates the use of 10 percent silver impregnated active carbon with prefiltration in a water purifier.

FIG. 1 is a graph of total iodine content in feed water and treated water as a function of the quantity of water passed through a sample of example 1. FIG. 2 is a similar graph relating to example 2. FIG. 3 is a similar graph relating to example 3. FIG. 4 is a similar graph relating to example 4. FIG. 5 is a graph of the same parameters, relating to four samples of commercially prepared compositions of the invention. FIG. 6 is a graph of eluted iodine and iodide versus the quantity of water passed through a Counter-Top water purifier containing disinfecting resin (PDR) and an EC-10 Ag/GAC sample of FIG. 5.

FIGS. 1 to 4 demonstrate the effectiveness of the samples of Ag-GAC prepared according to Examples 1 to 4, above in reducing the concentrations of iodine/iodide contained in water treated by PuroTech Disinfecting Resin (PDR—a commercial iodinated resin) to levels permissible for continuous human drinking applications. The water treated is Tel-Aviv City tap water, having a conductivity of 950–1,600 $\mu$S/cm, and at a temperature of 21–25° C. The water was passed through a chamber containing PDR and then through 150–160 ml of the Ag-GAC sample at a rate of 2 liters/min. Samples were taken of water entering and leaving the Ag-GAC chamber, as shown in the individual graphs.

FIG. 5 demonstrates the effectiveness of various types of 5–10% Ag-GAC, produced specially for these tests by manufacturers of activated carbon and of Ag-GAC, in reducing the concentrations of iodine/iodide contained in Tel-Aviv City tap water treated by PDR, as described above, to levels permissible for continuous human drinking applications. The relevant properties of the Ag-GAC samples tested in this experiment, and their actual performance, are summarized in the Table below. In these tests, 120 ml samples were treated with the same feed stream at a flow rate of 0.72 liters/min each.

| Code | EC-10 | PC-7 | EC-5 | SS-5 |
|---|---|---|---|---|
| Density, gr/ml | 0.606 | 0.537 | 0.573 | 0.560 |
| Silver Content, | | | | |
| % w/w | 10 | 7 | 5 | 5 |
| gr/L | 60.6 | 37.6 | 28.6 | 28.0 |

-continued

| Code | EC-10 | PC-7 | EC-5 | SS-5 |
|---|---|---|---|---|
| Theoretical Capacity for 2.5 ppm $I^-$ Feed, liter | 28,500 | 17,700 | 13,450 | 13,200 |
| Practical Capacity for <1 ppm $I^-$ Product, lit | 21,000 | 11,000 | 10,050 | 9,500 |
| Practical Efficiency, % | 74 | 62 | 75 | 72 |

FIG. 6 illustrates the practical use of 10% silver impregnated granular activated carbon together with 5μ prefiltration and iodinated resin disinfection in a single 10" standard CounTertop drinking water purifier. The amount of Ag-GAC used in this example was 280 ml. The capacity of the filter is limited by the permissible maximum or average level of iodide in the product water. Using the "adjusted acceptable daily intake" (AADI), of iodine/iodide, determined to be 1.19 mg/L, as mentioned previously, the capacity of the filter is approximately 5,000 liters. At the average daily use of 4 liters per person, this capacity is sufficient for a family of four for over nine months or a family of seven for six months, both practical figures, common to many popular water filtration devices.

What is claimed is:

1. A process for purification of drinking water for use over prolonged periods of time without adverse effects due to iodine ingestion comprising the steps of:

contacting the water to be purified with an iodinated resin so as to eliminate bacteria and viruses and produce disinfected water, and passing the disinfected water, containing iodide and iodine eluted from the iodinated resin, through a bed of activated carbon which is loaded with at least 2 weight percent of silver so as to reduce the concentration of iodine/iodide in the water and produce water which is potable over prolonged periods of time.

2. A process according to claim 1, wherein a final iodide/iodine concentration is less than 1.19 ppm.

3. A process according to claim 1, wherein the activated carbon is granulated and contains from 4 to 14 weight-% of silver.

4. A process according to claim 1, wherein the silver and iodine are recovered by working up precipitated silver iodide.

5. A purification device for producing potable water which can be drunk by humans over prolonged periods of time without any adverse effect due to intake of too much iodine/iodide comprising:

a bed of an iodinated resin, and a bed of granulated activated carbon following said bed of iodinated resin and carrying at least 2 weight-% silver.

6. A device according to claim 5, and further comprising a filter for filtering out particulate material.

7. A device according to claim 5, wherein said granular activated carbon is loaded with from 4 to 14 weight-% silver.

* * * * *